Sept. 16, 1969  R. A. M. TOESCA  3,467,072
COMBUSTION OPTIMIZING DEVICES AND METHODS
Filed Aug. 31, 1966  2 Sheets-Sheet 1
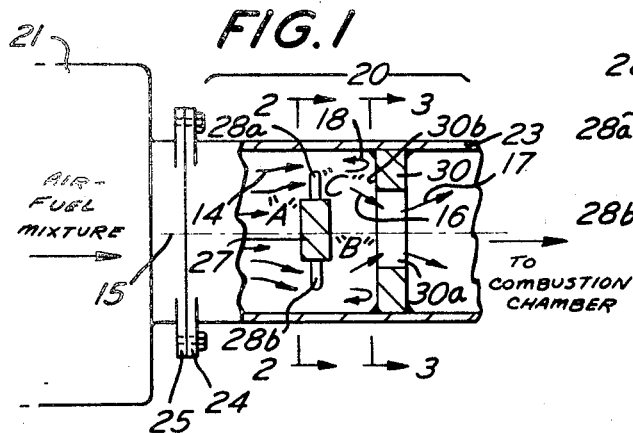
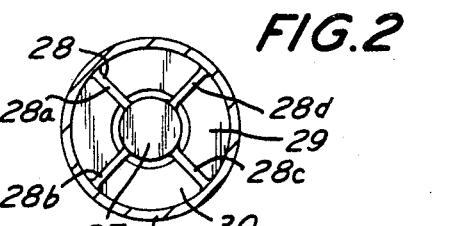
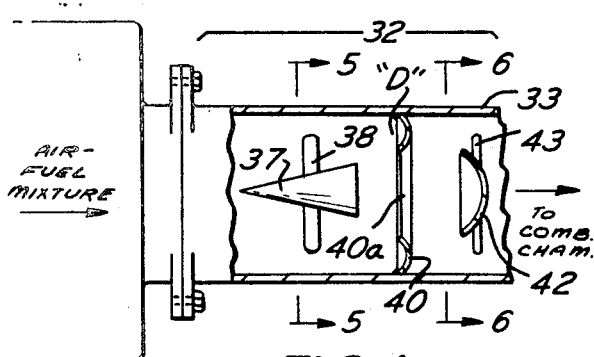
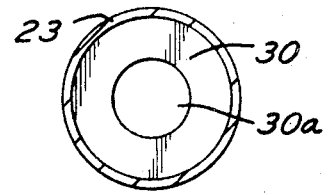
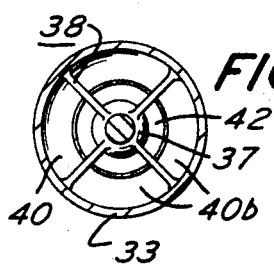
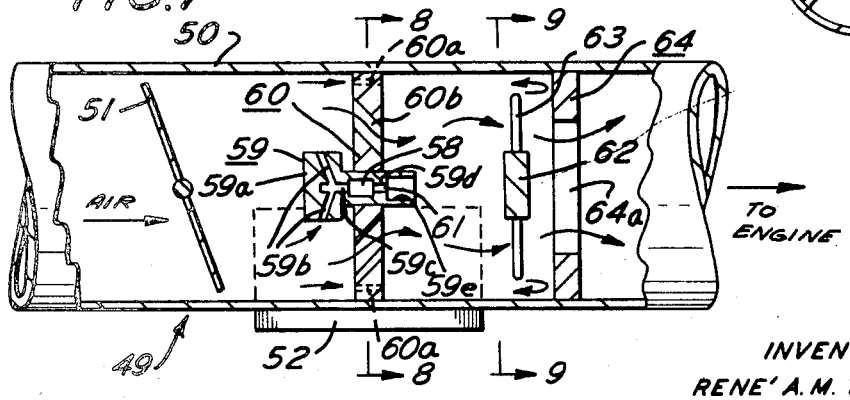
INVENTOR
RENE' A. M. TOESCA
BY
Bilker, Kimmelman & Moyerman
ATTORNEYS.

Sept. 16, 1969   R. A. M. TOESCA   3,467,072
COMBUSTION OPTIMIZING DEVICES AND METHODS
Filed Aug. 31, 1966   2 Sheets-Sheet 2

INVENTOR.
RENE' A. M. TOESCA
BY
Bilker, Kimmelman & Moyerman
ATTORNEYS.

United States Patent Office 3,467,072
Patented Sept. 16, 1969

3,467,072
COMBUSTION OPTIMIZING DEVICES
AND METHODS
Rene A. M. Toesca, Boyertown, Pa., assignor to Energy
Transformation Corporation, a corporation of Delaware
Filed Aug. 31, 1966, Ser. No. 576,428
Int. Cl. F02m 29/00; B01f 3/02
U.S. Cl. 123—141                                3 Claims

ABSTRACT OF THE DISCLOSURE

Apparatus is shown which may include a baffle positioned in an air flow for separating heavier fuel particles in a fuel-air mixture from lighter (smaller) ones as a function of the inertia of the particles. The lighter particles are easily entrained by the air flow to the engine for substantially complete combustion therein. The heavier particles are turned back and subjected to other air currents which break them up into smaller particles until they are light enough to be borne to the engine where they also are substantially completely consumed by combustion.

---

This invention relates to devices for optimizing the combustion of fuel in internal combustion engines. In particular, it pertains to devices including carburetors which can operate to reduce pollution of the air, especially in modern urban areas while tending to optimize combustion by controlling the fuel-air mixture passing into the engines.

With the increasing industrialization and affluence of the countries of the world, there has come a corresponding increase in the pollution of the air. Some of this pollution is, of course, due to industrial wastes which are spewed out heedlessly into the atmosphere. However, a rapidly increasing component of such pollution arises from the increasingly greater numbers of automobiles produced and driven as the prosperity of a nation waxes.

In the past, attempts have been made to reduce air pollution due to cars by devices which are operative *after* combustion has taken place. These devices are based on the fact that the pollution is due to imperfect or incomplete combustion products which appear in the engine exhaust. Consequently, these devices burn or chemically neutralize the unwanted exhaust products.

A more fruitful approach is to investigate ways in which more perfect combustion of the fuel particles can be achieved. By so doing, there will be, in the first instance, substantially fewer residual polluting products in the exhaust. As a result of the more perfect combustion, greater fuel economy, smoother operation and other advantages also accrue.

It is, therefore, among the objects of the present invention to provide:

(1) Novel devices including carburetors which considerably reduce pollution of the air caused by the release of engine exhaust products.

(2) Novel devices including carburetors in which more perfect combustion of the fuel is accomplished.

(3) Novel devices including carburetors which tend to automatically maintain an optimum fuel-air ratio.

(4) Novel devices including carburetors which automatically meters the fuel in response to the engine demand.

(5) Novel devices including carburetors which act to apply only relatively small fuel particles to the engine.

(6) Novel devices including carburetors which are relatively simple, inexpensive to produce and to maintain.

(7) Novel devices including carburetors which enable an internal combustion engine to run more smoothly because of more uniform combustion in all cylinders.

FIGURE 1 is a schematic diagram of a very simple embodiment of the present inventive concept.

FIGURE 2 is a sectional view of the apparatus shown in FIGURE 1 taken along the section line 2—2.

FIGURE 3 is a sectional view of the portion of the apparatus shown in FIGURE 1 taken along section line 3—3.

FIGURE 4 is a somewhat more advanced form of my invention shown in partly sectional view.

FIGURE 5 is a sectional view of part of the apparatus shown in FIGURE 4 taken along section line 5—5.

FIGURE 6 is a sectional view of a portion of the apparatus shown in FIGURE 4 taken along section lines 6—6.

FIGURE 7 shows still another form of the present invention in sectional view.

Figure 8:
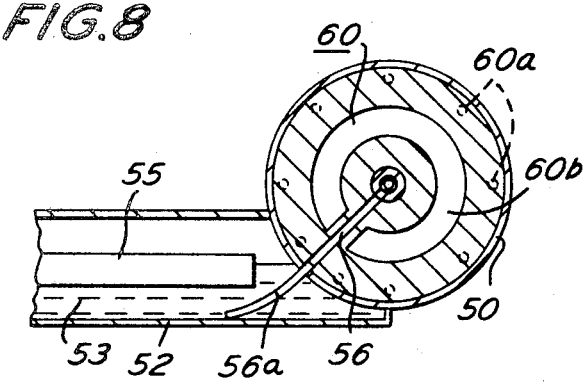
FIGURE 8 is a section of a portion of the apparatus of FIGURE 7 taken along the section line 8—8.

In accordance with the present invention, there are provided devices and methods for optimizing combustion of a suspension of fuel particles in air by an internal combustion engine. In general, this invention comprises (1) apparatus and corresponding methods for separating heavier ones of the fuel particles in the fuel-air suspension from lighter ones as a function of the inertia of the particles, (2) applying the separated lighter particles to the engine for substantially complete combustion, (3) comminuting by air currents the separated heavier ones of the fuel particles to particles whose size enables substantially complete combustion of them, and (4) applying the comminuted particles to the engine. In subjecting the heavier particles to air currents to comminute them, it is also found that the turbulence produced as a result of the air currents increases the vaporization of the fuel (and hence combustion efficiency) more than occurs in conventional devices. In some forms of the invention, the device may be used between the output of the carburetor and the intake manifold of the engine; in others, it is a complete carburetion system in itself.

FIGURE 1 shows a device indicated generally by the numeral 20 which may be attached between the output of a conventional carburetor 21, for example, and the intake manifold of an internal combustion engine. Within a tubular member 23 having a flange 24 which is bolted or otherwise affixed to a corresponding flange 25 of the carburetor output there is disposed, generally co-axial with the axis of the tube 23, a generally disc-shaped baffle 27. The baffle 27 is supported by a spider 28 comprising four legs 28a, 28b, 28c, and 28d whose outer ends are fixed as by welding to the interior wall of the tubing 23.

To the right and downstream of the baffle 27 is an annular member 30 whose outer periphery is fixed, as by welding to the inner surface of the tube 23. It has a central opening 30a' which is just slightly larger in diameter than the diameter of the baffle 27.

As the engine operates, it will produce suction at the output of the carburetor. Thus, at the entrance to the device 20, there will appear a stream of gas particles of all sizes entrained in a stream of air. Because of the conjoint effect of the baffle 27 and annulus 30, the air currents through the device 20 will take the path indicated by the arrows in FIG. 1. The fuel-air mixture approaches the baffle 27 from the left as shown by arrows 14. The part of the stream closest to the axis 15 will be turned backward and form eddy currents just in front of baffle 27. These eddy currents will have vectorial components which will oppose and/or deflect the oncoming stream thereby tending to throw the more centrally located portions thereof off-axis. Smaller fuel particles entrained in the centrally located portions will travel outwardly from axis 15 and into the spaces 29 between the legs of the spider 28. However, larger and heavier particles, having more momentum, will tend to stay near the axis and be caught in the eddies forming at A whereupon the diverse air currents there will comminute them. Those of these comminuted particles which are small enough will be caught up in the air stream passing through spaces 29. Those which are not small (i.e., light) enough will be again drawn toward the eddies in front of baffle 27 whereupon they are further broken up by the eddy action or impact on the baffle.

The portions of the fuel-air stream outwardly of the axial portion will tend to pass through the spaces in relatively straight trajectories, the most outwardly having the straighter paths and vice-versa. In the spaces 29, therefore, there will also be a range of sizes of fuel particles entrained in the airstream.

The fuel-air suspension moving through the spaces 29 will be generally deflected toward the axis 15 by the annular member 30. Eddy currents of the mixture will also be produced in the region C as shown by the arrows 28. The net effect of these eddy currents is to cause the fuel-air mixture to move inwardly as shown by the arrows 16 passing through the aperture 30a. As before, however, only the very lightest particles will be entrained in the air stream moving inwardly and through the aperture 30a. Heavier particles will proceed by inertia in straighter paths to the region C, whereupon they will be broken up by the eddy currents into smaller particles and the lightest will then go through the apertures 30a.

It will, therefore, be seen that the device 20 acts to present to the engine a mixture or suspension of many homogeneous small fuel particles in air. Consequently, combustion of the fuel in the suspension is maximized by the very large aggregate surface contact area. Since the fuel particles that enter the cylinders are relatively more uniform in size because of the classifying and comminuting effects of the present invention, the associated engine will run more smoothly than those with which most conventional devices are used. In the latter, because of the larger range of fuel particles applied to the intake manifold of the associated engines, there is usually a relatively large difference in the range of fuel particles found in the different cylinders, which makes for rougher operation. Since the particles are small, very few of them will not be completely consumed in the combustion process. Furthermore, by the production of turbulence due to the eddy currents produced by the baffles, vaporization of the fuel is considerable enhanced as compared with conventional devices. Hence, the exhaust products will have a minimum of unconsumed or partially consumed hydrocarbons.

FIGURE 4 shows still another form that the invention may take. In this device designated generally at the numeral 32, instead of a generally disc-like or cylindrical baffle 27, there is a conical baffle 37 suspended from the walls of the housing tube 33 by a spider 38. To the right of this is an annular member 40 having a central aperture 40a, the member 40 being joined at its outer periphery to the inner surface of tube 33. The member 40 has a C-shaped cross section with the concave portion facing to the left.

To the right of member 40 and generally co-axial therewith a dish-shaped baffle 42 is supported from the inner surface of the tube 33 by means of a spider 43.

This embodiment works somewhat differently from the previous form inasmuch as no appreciable air eddies are produced in the immediate vicinity of the first baffle 37. Instead, the latter element serves to cause the generally axially portion of the fuel-air stream from the carburetor initially to diverge. Consequently, the heavier particles will be led by the air stream onto the concave surface of the member 40 whereupon rotating eddies will be formed at D similar to the ones at C in FIG. 1. Here, again, the heavier particles in the stream will tend to be comminuted by the turbulent air whereas the lighter particles in the mixture, having less inertia, will be borne by the air stream downward toward the aperture 40a by virtue of the suction created by the engine. When the heavier particles in the eddies D are divided into small enough particles, they also will be entrained by the air stream passing through the aperture 40a.

After the stream passes through the aperture 40a, the heavier particles therein will tend to impinge upon the baffle 42 and possibly be splattered by impingement thereon or be caught up in eddies directly in front of it and reduced further in size. The lighter particles in the stream will tend to be drawn outwardly (off-axis) with the air stream through spaces 43a of the baffle 42. Again, as soon as the heavier particles which are caught in the eddy to the left of the baffle 42 are reduced in size, they also will be entrained with the lighter particles and carried off to the engine intake manifold.

FIGURE 7 shows an embodiment 49 of the invention which is not intended to be an adjunct to a carburetor but to serve as the carburetor itself. It comprises a tubular member 50 in which, upstream of the carburetor, there is a choke 51 which can be pivoted by conventional means. On the side of the tube 50 remote from the reader, there is affixed a bowl 52 into which the fuel 53 flows. A float valve 55 may be used to regulate the input in a conventional manner. The interior of the bowl 52 communicates via passageway 56 and extension 56a with a mixing chamber 58 formed within a mixing member indicated generally at the numeral 59. Extension 56a should extend close to the bottom and toward the center of the bowl 52 so as to insure that the fuel will always be in position to be sucked up into passageway 56 regardless of the position of the fuel in the bowl. This position may change due to sudden starts or stops, to cornering, or to steep inclines and declines. By this arrangement the fuel-air ratio tends to be kept relatively constant since the fuel head at the lower end of extension 56a is maintained quite uniform.

The mixing member 59 is disposed fixedly along the axis of a generally cylindrical member 60 that is fixed at its edge to the inner surface of the member 50. Surrounding the member 59 is a generally annular angled passageway 60b formed in the member 60.

The larger diameter portion 59a of the member 59 has formed therein a number of angled passageways 59b which are connected by axial passageway 59c to the mixing chamber 58 with which the passageway 56 directly communicates. The chamber 58 also communicates with the portion 59e via restricted passageway 61.

There is also, downstream of the member 60, a baffle 62 supported by a spider 63 from the inner surface of the tube 50. This baffle 62 can be quite similar to the baffle 27 of FIG. 1. To the right of baffle 62 there is an annular member 64 whose periphery is permanently joined to the inner surface of tube 50. Member 64 has a central opening 64a and can be approximately the same construction as the member 30 in FIG. 1. In fact, the operation of the device shown in FIG. 7 to the right of the section line 9—9 is identical with the operation of the device 20 shown in FIG. 1.

Air enters from the left of the tube 50 past the choke 51 due to the suction created to the right of the member 64 by the operation of the engine. Due to this same suction, air enters the member 59a through the passageways 59b and air enters mixing chamber 58 into which fuel is sucked through the passageway 56. This produces a fuel-air mixture which passes through the passageway or orifice 61 formed in the member 59d. Consequently, the orifice acts as a nozzle and to the right of it within portion 59e there will appear a mixture of fuel particles of various sizes suspended in an air stream at high velocity. The heavier particles because of their momentum will not depart much from the axis and hence will be drawn toward and possibly impinge on the baffle 62. The lighter particles will tend to diverge and follow the air currents passing around the baffle 62 through the spider 63. The action of the baffle 62 is substantially the same as the baffle 27 in FIG. 1 but to the eddy current action is added the effect of the converging stream of air caused by the passage of air through the annular passageway 60b. This stream will tend to disrupt the stream issuing from the nozzle 61, thereby causing even more atomization.

Passing through the spaces 40b in spider 63 will be a mixture of lighter and heavier fuel particles. While the air stream will tend to converge in this region before passing through aperture 64a, the heavier particles cannot change direction as quickly, and they will be directed toward the left surface of the annular member 64 on which they will impinge and be comminuted or be caught up in the eddy currents there (see C FIG. 1) and be atomized. The lighter particles will successfully negotiate the converging change of direction of the air stream and will pass through the aperture 64a. Thus, as in the previous embodiments, the input to the intake manifold will be a very homogenous stream of very small fuel particles suspended in air. This makes for complete and optimum combustion conditions.

If the apparatus of FIG. 7 is used in a vertical position, as it can be, so that the flow of fuel-air is upward, additional apertures 60a (in broken lines) may be formed in member 60. They aid in breaking up those heavier particles which go off-axis after emanating from portion 59e and fall under the influence of gravity. The high velocity jets of air through apertures 60a will further comminute these recycled heavier particles until they are of a size (weight) which will enable them to be entrained in the air passing above baffle 62.

Figure 9:
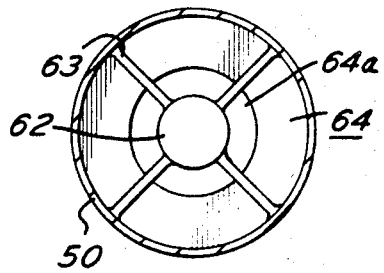
FIGURE 9 is a sectional view of another portion of the apparatus shown in FIGURE 7 taken along the section line 9—9.
Figure 10A:
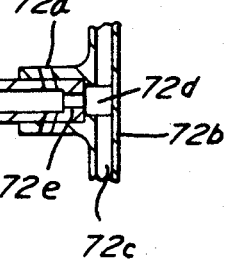
FIGURE 10a is an enlarged view of a portion of the apparatus shown in FIGURE 10.
Figure 10:
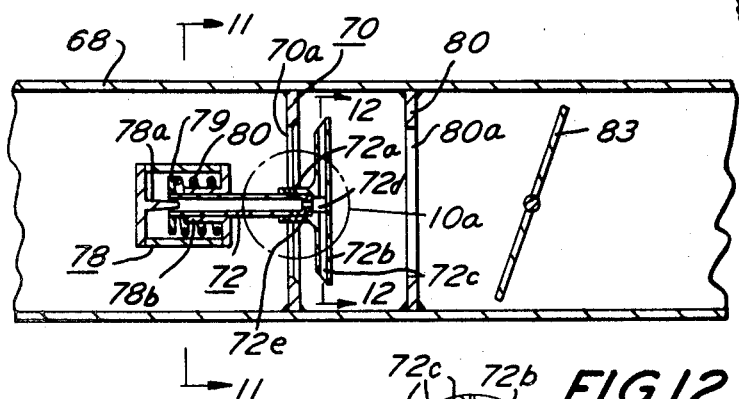
FIGURE 10 is a side elevational, sectional view of another embodiment of the present invention.
Figure 12:
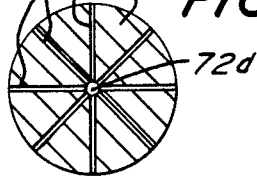
FIGURE 12 is a sectional view of a portion of the apparatus shown in FIGURE 10 taken along the section line 12—12.
Figure 11:
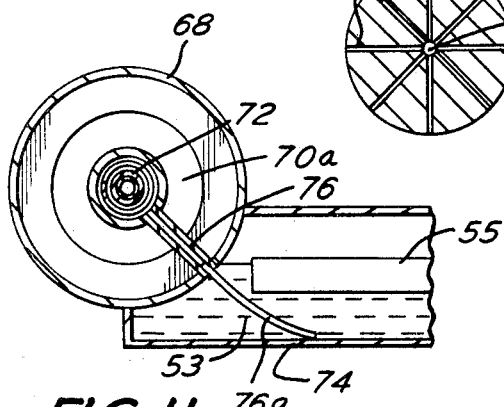
FIGURE 11 is a sectional view of the portion of the apparatus shown in FIGURE 10 taken along the section line 11—11.

FIGURES 10–12 show still another embodiment of the present invention, which is most similar to the form shown in FIGS. 7–9. Intake air comes into the left portion of the tube 68 and takes two main paths. One path is to proceed toward and through the opening 70a in an annular valve seat member 70 which is attached to the inner surface of the tube 68, as shown. The other path is for the air to enter the mixing tube-valve stem assembly 72 via angled inlet apertures 72a that communicate with the tubular interior. As in the previous form, there is a supply bowl 74 attached to the member 68 on the outside. It is filled with liquid fuel 53 and has a float 55. The gasoline in the bowl 74 communicates by means of tubular member 76 and extension 76a similar to extension 56a in FIG. 8) with the interior of a reciprocating fuel chamber 78. The fuel enters the mixing tube 72 from chamber 78 by passing around a metering projection 78a attached to the left wall of the chamber 78. The entire chamber 78 is supported by the tubular member 76 whose lower end is fixed to an aperture in the tube 68. Toward the right end of the valve member 72, there is located a generally disc-shaped liquid-dispensing portion 72b having radial channels 72c formed therein. These channels communicate with the chamber 72d located just to the right of a constricted shoulder portion 72e in the assembly 72. The channels 72c have outer openings which communicate with the space between members 70 and 80.

It will be noted that the stem portion 72f of assembly 72 is suspended in sliding relation in the tubular portion 78b of the chamber 78. The left end of the portion 78b serves to limit the sliding movement of the valve 72 toward the right since it is fixed to a generally annular member 79. For initial or starting purposes, movement of valve 72 toward the left may be controlled, if desired (rather than using a choke as shown in FIG. 7) by appropriate mechanical linkage or cable (not shown) which is thermostatically governed, if desired. The metering pin 78a will tend to limit the amount of fuel from entering the tubular stem portion 72f when it is further into the portion 72f than when it is more withdrawn therefrom.

When the engine is on, its suction will pull the valve portion 72b toward the right, whereupon the clearance around the metering pin 78a will increasingly enable more fuel to enter the stem 72f of 72. When the valve 72 is pulled toward the right, the incoming air will tend to converge as it approaches valve member 70 before passing through aperture 70a thereof and then will be forced outwardly by the shape of member 72b. Simultaneously, fuel will be sucked into the stem 72f from the bowl and will be mixed with air entering the valve 72 via passageways 72a. The suction will pull the fuel-air mixture through the orifice in the shoulder 72e which produces a nozzle effect. The mixture then passes radially outward from the chamber 72d by the passageways 72c and into the path of the air which is passing upward and around the edge of valve 72b.

As in FIGURE 1, when the air stream begins to reconverge as it approaches aperture 80a, the heavier particles' interia, will resist the change in path so that they will tend to travel in more straight line paths toward the member 80. The finer particles, being lighter, will be entrained by the air stream as it converges toward the aperture 80a. Also, as in the first embodiment, the larger particles will be broken up in the eddies just to the left of the annular member 80 until they are of a size small enough to be entrained with the air converging through the aperture 80a. A throttle 83 is located downstream of the annular member 80.

Figure 13:
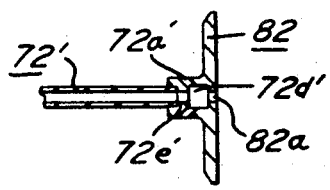
FIGURE 13 shows a modified form that a component of the apparatus illustrated in FIGURE 10 may alternatively take.

FIGURE 13 shows how the embodiment of FIG. 10 can be modified. Parts somewhat similar to those in FIG. 12 bear the same numbers but are primed. It will be noted that the chief difference between the valve assembly 72 and the valve assembly 72' resides in the fact that the passageways 72a' for air intake into the mixing portion of the valve 72' are located somewhat more to the right and communicate directly with the chamber 72d'. Chamber 72d' communicates by an orifice 84 with the space between members 70 and 80. Furthermore, the valve head portion 82 does not have any radial passageways formed therein. Instead, it has a single central atomizing orifice 82a located on the axis of the stem 72'. Alternatively, it may have several orifices (not shown) arranged on and/or about the axis of the valve 72', for example. In any event, the operation of the device is essentially similar to the valve assembly 72 except for the direction of dispersion of the fuel-air mixture. This embodiment, like all the other embodiments, may be used vertically or horizontally or at other angles. The only practical difference would be the different effect of gravity on the trajectory of the particles of the fuel. If the air flow is upward, the heavier particles will tend to be recycled to an earlier portion of air flow for further comminution by eddies.

The deliverate production of eddy currents of air to reduce fuel particle size also has the very important advantage of increasing the vaporization of the fuel which makes for even greater combustion efficiency of the described devices.

I claim:
1. A method for optimizing the combustion of a suspension of fuel particles in air by an internal combustion engine comprising the steps:
   (a) producing a flow of said suspension in a given path having a predetermined axis,
   (b) subjecting said flow to a force component substantially transverse to said axis whereby the heavier particles of said suspension are deviated from said axis to a lesser extent than the lighter particles thereof as a function of the inertia of said particles,
   (c) then converging said lighter particles toward said axis in a non-rotational stream of air,
   (d) applying said deviated lighter particles along a non-rotational path to said engine for substantially complete combustion thereof,
   (e) subjecting said lesser deviated heavier particles to air currents thereby to comminute them to lighter particles of a size which can be substantially completely consumed by combustion in said engine,
   (f) converging said last-named comminuted particles toward said axis in a non-rotational stream of air, and
   (g) applying said comminuted particles along a non-rotational path to said engine for substantially complete combustion therein,
   said (b) and (e) steps enabling the application to said engine by said (d) and (g) steps of a very homogeneous fuel-in-air suspension.

2. The method according to claim 1 wherein at least one of said steps (d) or (e) also produces appreciable vaporization of said fuel.

3. The method according to claim 1 wherein said (d) step produces appreciable vaporization of said fuel.

References Cited

UNITED STATES PATENTS

| 1,106,452 | 8/1914 | Ittner | 123—141 X |
| 1,600,007 | 9/1926 | Mock. | |
| 1,866,829 | 7/1932 | Welling | 48—180 |
| 1,873,082 | 8/1932 | Vostrez. | |
| 2,152,206 | 3/1939 | Neal | 48—180 |
| 1,000,385 | 8/1911 | Eberle. | |
| 1,092,279 | 4/1914 | Martin et al. | |
| 1,629,565 | 5/1927 | Wirrer. | |
| 1,868,767 | 7/1932 | Ross | 123—131 |

FOREIGN PATENTS 497,349   9/1954   Italy.

AL LAWRENCE SMITH, Primary Examiner

U.S. Cl. X.R.

48—180; 55—463, 465; 261—50, 76, 78